United States Patent [19]
Kelly

[11] Patent Number: 5,734,872
[45] Date of Patent: Mar. 31, 1998

[54] CPU INTERCONNECT SYSTEM FOR A COMPUTER

[76] Inventor: Michael Kelly, 45 Lakeside Ave., Marlboro, Mass. 01752

[21] Appl. No.: 725,061

[22] Filed: Oct. 2, 1996

Related U.S. Application Data

[63] Continuation of Ser. No. 308,815, Sep. 19, 1994, abandoned.
[51] Int. Cl.⁶ ........................................... G06F 13/00
[52] U.S. Cl. ..................... 395/500; 395/284; 395/309; 395/882
[58] Field of Search ........................... 395/882, 500, 395/284, 309

[56] References Cited

U.S. PATENT DOCUMENTS

| | | | |
|---|---|---|---|
| 4,885,482 | 12/1989 | Sharp et al. | 307/465 |
| 4,967,346 | 10/1990 | Freidin | 395/500 |
| 5,321,827 | 6/1994 | Lu et al. | 395/500 |
| 5,408,611 | 4/1995 | Kim | 395/500 |
| 5,615,344 | 3/1997 | Corder | 395/882 |

*Primary Examiner*—Jack B. Harvey
*Assistant Examiner*—David A. Wiley
*Attorney, Agent, or Firm*—Wolf, Greenfield & Sacks, P.C.

[57] ABSTRACT

A CPU interconnect system permits swapping of different CPUs in a computer without requiring that the different CPUs each be adapted to conform to a standard input/output bus. Translation between CPU input/output lines and a system bus is accomplished by a programmable logic circuit. A memory containing a configuration program for the programmable logic circuit is associated with each CPU desired to be swapped. Thus, when a CPU is swapped or upon the occurrence of any other convenient event, the programmable logic circuit may be loaded with the program to configure the programmable logic circuit to perform the translation required by a current CPU.

16 Claims, 2 Drawing Sheets

CPU INTERCONNECT SYSTEM FOR A COMPUTER

This application is a continuation, of application Ser. No. 08/308,815, filed Sep.19, 1994 now abandoned.

Background

1. Field of the Invention

The present invention relates to computer sub-system interconnect systems. More particularly, the present invention relates to such interconnect systems adapted for use in computers wherein the computer design permits an application-specific choice among several different central processing units (CPUs), not all of which are installed in the computer at any one time, independent of the design of the balance of the computer system.

2. Background

A single-board computer (SBC) is one in which all the essential computer components required to perform the desired computer function are substantially contained on a single printed wiring module or board. The heart of such a machine is a central processing unit (CPU). The CPU controls the operation of the machine and performs various types of input/output (I/O) operations, calculations and logical operations in accordance with computer program instructions. In order to do so, the CPU is generally supported by memory and I/O circuits on the printed wiring module.

Single-board computers are often adapted for specific functions. For example, they may be used as controllers for other machines or large systems, and SBCs are often designed with this flexibility in mind. Included in the memory is a portion which is typically read-only, and which contains a set of customized program instructions directing the CPU to perform the specific task for which the SBC is adapted. However, the flexibility afforded by reprogramming may not be adequate to adapt current SBCs to all the tasks to which they may otherwise be successfully applied, because for sufficiently different tasks, different CPUs may be desirable. Yet, designers ordinarily cannot readily swap one CPU for another CPU better suited to a specific application or needs of a user.

Therefore, one solution to this problem has been to locate the memory and I/O circuits on a motherboard and the CPU on a very small daughterboard. In order to interconnect daughterboards carrying different CPUs to a common motherboard design, prior art technology requires that a standard CPU bus be designed and implemented. Central processing units having other than the standard CPU bus as their native interconnection scheme would be adapted by logic on the daughterboard to interface with the signals of the standard CPU bus. However, this approach has the disadvantage of requiring a sometimes significant amount of logic circuits to be present on the daughterboard to perform the adaptation and service the standard CPU bus interface.

It should be noted that the above-described problem in the prior art may also arise in computer systems other than SBCs wherein a flexible system is desired which includes the capability of swapping CPUs among CPUs of different types.

SUMMARY OF THE INVENTION

Therefore, it is one general goal of the present invention to provide an interconnection system for adapting a variety of CPUs having different native interconnection schemes to a common system bus. Another goal of the present invention is to reduce the number of parts included on the daughterboard, thereby reducing the cost of CPU daughterboards for connection to a common motherboard. These goals, and such others as will become clear to those skilled in the art, have been achieved in the present invention which is now summarized.

According to one aspect of the present invention, there is provided a CPU interconnect system for a computer, the computer including a CPU having input/output lines and the computer further including a system bus. The interconnect system comprises a programmable logic circuit having a first set of input/output lines connected to the input/output lines of the CPU and a second set of input/output lines connected to the system bus; and a memory containing a configuration program including instructions to the programmable logic circuit to map the input/output lines of the CPU to the system bus and connected to program the programmable logic circuit each time a predetermined event occurs.

According to another aspect of the invention, there is provided a single-board computer including a motherboard having a connector electrically connected to a programmable logic circuit, the programmable logic circuit further being electrically connected to a system bus having system bus lines, and the single-board computer further including a CPU daughterboard. The CPU daughterboard comprises a daughterboard connector adapted to mate with the connector included on the motherboard; a CPU having CPU input/output lines electrically connected to the daughterboard connector; and a non-volatile memory containing a configuration program for the programmable logic circuit; wherein loading the configuration program configures the programmable logic circuit to map between the CPU input/output lines and the system bus.

According to yet another aspect of the invention, there is provided in a single-board computer including a daughterboard having a CPU with CPU input/output lines connected to a daughterboard connector and a non-volatile memory containing a configuration program for a programmable logic circuit, a motherboard. The motherboard comprises a connector adapted to mate with the daughterboard connector; and a programmable logic circuit having input lines electrically connected to the motherboard connector and output lines connected to a system bus; wherein loading the configuration program configures the programmable logic circuit to map between the CPU signals and the system bus signals.

According to yet another aspect of the invention, there is provided a CPU interconnect system for a computer, the computer including a CPU having input/output lines disposed on a first module and the computer further including a system bus disposed on a second module. The interconnect system may include elements for connecting the input/output lines of the CPU to the system bus in accordance with a mapping not fixed in the elements for connecting, disposed on the second module; and elements for loading the mapping into the elements for connecting, the elements For loading operative upon the occurrence of a predetermined event. The elements for connecting may include such conductors and connectors or sockets as may be required to electrically connect signals from their sources to their destinations. Further in accordance with this aspect of the invention, the elements For loading may comprise an element for holding the mapping, disposed on the first module.

Variations on each of the above aspects of the invention are possible. For example, the elements for holding or memory may be any of a variety of types of non-volatile memory, such as read-only memory (ROM), electrically alterable read-only memory (EAROM), non-volatile random access memory (NVRAM) or battery backed up random access memory. The CPU may further be one of a plurality of CPU types. For example, the CPU types supported may include processors of various data and address bus widths made by Intel, Motorola, AMD, IBM, etc. The mapping held by the elements for holding or memory corresponds to the CPU type. The programmable logic circuit may be a field programmable logic array (FPGA) or other similar programmable circuit. For example, the programmable logic circuit could be programmable array logic (PAL), an application-specific integrated circuit (ASIC), or other circuit including programmable and reprogrammable logic. The predetermined event may be any convenient event, such as power up or some form of operator intervention.

BRIEF DESCRIPTION OF THE DRAWING

In the drawing, like reference designations indicate like elements, and in which.

DETAILED DESCRIPTION

The present invention will be better understood when the following description is read in connection with the drawings.

Figure 1:
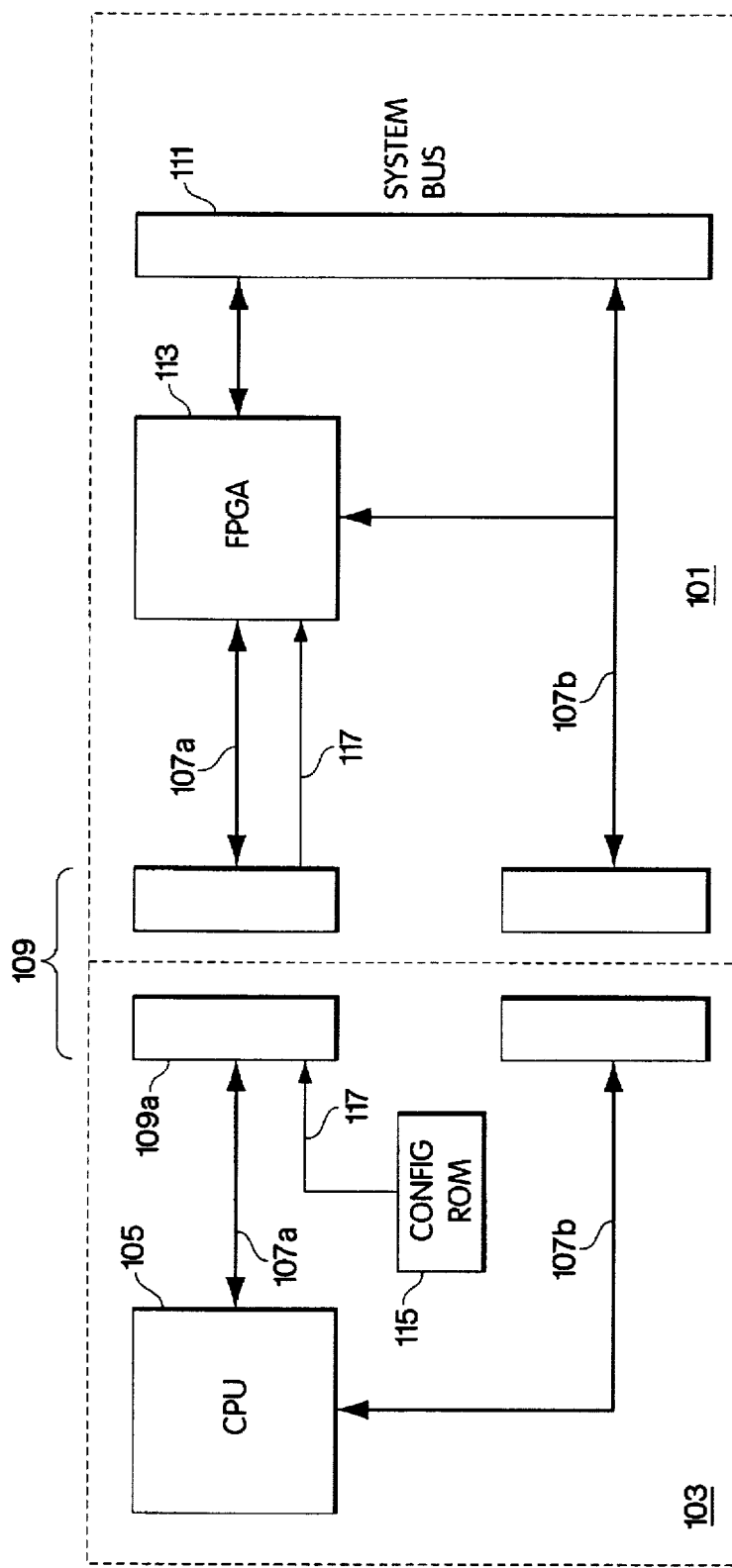
FIG. 1 is a schematic block diagram of one aspect of an embodiment of the present invention.

The block diagram of FIG. 1 illustrates an embodiment of the invention wherein there is provided a computer motherboard 101 including substantially all necessary computer functions for a particular application, except for the central processing functions. The central processing functions required by a particular application are supplied by plugging a daughterboard 103, including a central processing unit (CPU) 105, into a connector 109 on the motherboard. The interconnection between the CPU daughterboard 103 and the motherboard 101 is now described in greater detail.

The CPU 105 communicates with other components of the computer via signals sent over a plurality of input/output lines 107a and 107b. However, as noted above, different CPUs are defined to have one or more different input/output lines. Therefore, at least some of the connections between the CPU input/output lines and the motherboard are programmable (e.g., input/output lines 107a). In the illustrated embodiment, the CPU input/output lines are connected to the motherboard through an interface including connectors 109. Although in conventional interconnect systems the individual conductors of such connectors would be defined to correspond to specific ones of the CPU input/output lines 107a and 107b, in this embodiment of the invention the CPU input/output lines 107a of each different CPU may be associated with the conductors of the connector in any convenient fashion. For example, if the system is implemented using conventional printed circuit techniques, considerations of run length, cross-talk between adjacent signal runs, etc. may be permitted to take precedence over forcing particular signals to appear on particular connector conductors. Thus, if CPU input/output lines 107a appear in different locations on different CPUs 105, they may be routed to different conductors of the connector 109a.

In this embodiment of the invention, the CPU input/output lines 107a are then mapped onto the system bus 111 by a field-programmable gate array (FPGA) 113. An FPGA is one type of programmable logic circuit device including a collection of general logic devices which may be connected together to form a desired logic function by programming. Programming usually involves loading a map of interconnections between the general logic devices into the FPGA. The general logic devices are usually serial logic elements, such as gates, but may also include parallel and clocked elements in some versions. The logic function embodied in a programmed FPGA may be as simple as a routing of signals, such as might be performed by a switch. However, the logic function may include such processing of signals as changing timing or polarity, or may produce output signals not found among the input signals, but which are logical combinations of the input signals. In use in embodiments of the present invention, the FPGA may be programmed to act as a cross-bar switch, or to perform one of the more complex logical signal processing tasks noted above.

After programming in accordance with this aspect of the invention, the FPGA 113 performs the overall logic function necessary to map the collection of functions represented by the CPU input/output lines 107a to the analogous collection of functions represented by the system bus 111. For example, a particular CPU 105 may issue memory read and write requests using one set of signals transmitted over the CPU input/output lines 107a, whereas the system bus 111 may include a different set of signals to perform read and write functions in an attached memory (not shown). The FPGA logic function is thus designed to map between the two distinct representations of the same function. A person of ordinary skill in this art is capable of designing such a mapping, given the various signal functions and timing requirements. It should also be evident that although this embodiment employs an FPGA, any similar programmable logic circuit may be used, without regard to whether that circuit resides in a single package or multiple packages.

A further feature of this embodiment of the present invention is the presence of a read-only memory (ROM) 115 on the CPU daughterboard 103. One purpose for this ROM 115 is to hold the program for the FPGA 113. Each CPU 105 may be accompanied by a ROM 115 containing a program which properly maps the CPU input/output lines 107a for that CPU 105 to the system bus 111. Thus, in the case of the illustrated embodiment of the invention, when different CPU daughterboards 103 including different CPUs 105 are plugged into the motherboard 101, the FPGA 113 may be loaded via program signal lines 117 with different programs corresponding to the mapping required for the different CPUs 105.

The memory 115 provided on the CPU daughterboard 103 need not be strictly read-only, but should be a non-volatile memory type. Any suitable type of memory which retains its contents while power is not applied to the daughterboard 103 may be employed. Thus, although the program for the FPGA 113 is retained during intervals of power being off, the CPU daughterboard 103 could be reprogrammed, when improvements are made to the FPGA program corresponding to the CPU 105 contained on a particular daughterboard 103. Electrically alterable read-only (EAROM) is an example of a memory which is non-volatile, and hence used primarily in a read-only mode, but whose contents may be changed from time to time, as required.

Furthermore, holding the program for the FPGA 113 need not be the only function of a ROM or similar memory 115 on the CPU daughterboard 103. For example, the ROM 115 may include instructions for programming other devices, additional configuration data for use by the CPU 105, or program instructions for one or more CPU functions. Other applications of that space in the ROM 115 which is not used by the FPGA program will become apparent to those designing specific applications.

The FPGA 113 may be loaded with the configuration program contained in the ROM 115 upon the occurrence of any convenient event. For example, the FPGA 113 may be loaded at system power up, upon issuance of a reset signal as a result of operator intervention, or upon a "hot swap" of CPU daughterboards 103 wherein power is maintained on the motherboard 101. Other automatic and operator intervention events which may be appropriate times to load the FPGA 113 will be readily apparent to those skilled in the art who may be developing any particular application.

It will be readily apparent to those skilled in this art that the invention may be practiced using technologies other than the conventional printed wiring technology involving conventional motherboards and daughterboards in connection with which the invention has been illustrated. For example, the circuitry described above as being associated with a daughterboard may be included in some type of hybrid or other integrated module, including integration onto a single component. The FPGA 113 and connector 109 technologies may be similarly varied, in accordance with generally accepted design techniques. For example, the connectors 109 may simply be a socket into which all hybrid CPU modules 103 may be designed to fit. Therefore, it is intended that the terms motherboard 101, daughterboard 103 and related terms in this application be broadly construed to include any technology by which the separation of function and connections between those functions discussed above may be accomplished.

Other variations are contemplated as within the scope of this invention. Read-only memory 115 may, for example, contain nothing more than an identification of the type of CPU 105 included on daughterboard 103. The corresponding programmable logic circuits 113 would contain a storage element containing configurations for a plurality of supported CPU types. Upon receipt of a CPU type identification from ROM 115, the programmable logic circuits 113 would then self-configure. In this arrangement, ROM 115 may be no more than a series of wire jumpers, while the programmable logic circuits 113 may include a ROM element.

Figure 2:
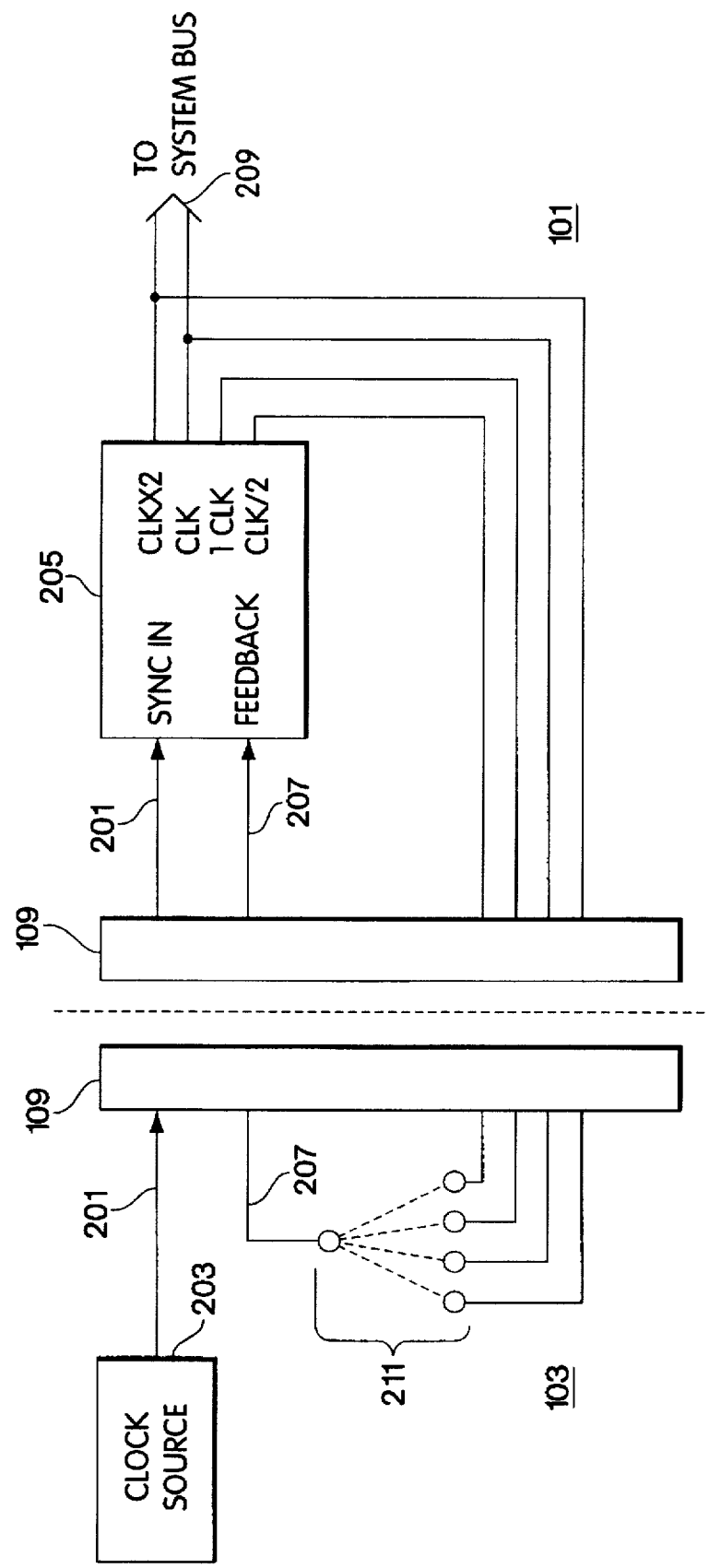
FIG. 2 is a block diagram of another aspect of an embodiment of the present invention.

Another aspect of the present invention, in accordance with the block diagram of FIG. 2, adapts the system clock of a computer in accordance with this invention to different CPUs. Operations performed by computers are coordinated in time by a clock signal which gives timing information to each of the various components of the system. Different CPUs generate clock signals using different circuits, as well as requiring clock signals having different timing or speed characteristics. For example, some CPUs generate clock signals internally, while others simply receive a clock signal from an external oscillator circuit; and some CPUs run at an external clock rate of 25 MHz, while others run at 33 MHz, 50 MHz, etc.

Whether the clock signal 201 is developed within the CPU itself, or simply supplied from an external oscillator circuit 203 to the CPU, it should be considered to be one of the CPU input/output signals 107b. Thus, the clock signal 201 is also connected via a connector 109 to the motherboard 101. On the motherboard 101, there resides a phase-locked loop circuit 205. The phase-locked loop circuit 205 compares the timing of the clock signal 201 to the timing of a feedback signal 207, and adjusts a clock output signal 209 to cause the timing to coincide. Thus, by providing on the CPU daughterboard 103 a speed selection connection 211 the system bus 111 may be provided with a clock output signal which is equal to, one-half of, or twice the speed of the sync in signal. By employing this aspect of the present invention, the clock signal 201 of the CPU daughterboard 103 is mapped onto the clock output signal 209 required by the motherboard 101. Moreover, the mapping is programmable over a wide range, by use of the speed selection connection 211, which is in essence a read-only memory. By altering the source of the feedback signal 207, the phase-locked loop circuit 205 is reprogrammed to run at the required rate for different CPU daughterboards 103.

The invention has now been shown and described in connection with several embodiments, but is not intended to be limited thereto. A number of modifications should now be obvious to those skilled in the art, and are contemplated as falling within the scope of the invention, which is limited only by the claims appended hereto.

What is claimed is:

1. A CPU interconnect system for a computer, the computer including a CPU module carrying a CPU selected from a plurality of CPU types and having input/output lines and the computer further including on a system module a system bus, the interconnect system comprising:

a connector set connecting signal lines of the CPU module to signal lines of the system module;

a reprogrammable logic circuit disposed on the system module, and having a first set of input/output lines connected through the connector set to the input/output lines of the CPU and a second set of input/output lines connected to the system bus, and having a logic function programmed by a configuration program including instructions defining the logic function; and a memory disclosed on the CPU module, containing a configuration program including instructions to the reprogrammable logic circuit to map the input/output lines of the CPU to the system bus and the memory connected through the connector set to the reprogrammable logic circuit to program the reprogrammable logic circuit in accordance with the configuration program each time a predetermined event occurs, whereby the reprogrammable logic circuit is programmed to perform the logic function.

2. The CPU interconnect system of claim 1, wherein the computer includes a daughterboard having the CPU and the memory thereon and a motherboard, the system further comprising:

means for detachably connecting the input/output lines of the CPU and the first set of input/output lines of the programmable logic circuit;

the means for connecting including a plurality of conductors, each connected to one of the input/output lines of the CPU and not having a fixed functional correspondence with functions of the input/output lines of a particular CPU type.

3. The CPU interconnect system of claim 2, wherein the programmable logic circuit is a field-programmable gate array.

4. The CPU interconnect system of claim 2, wherein the programmable logic circuit is an application-specific integrated circuit.

5. The CPU interconnect system of claim 2, wherein the memory includes a non-volatile memory.

6. The CPU interconnect system of claim 5, wherein the non-volatile memory is read-only memory.

7. The CPU interconnect system of claim 5, wherein the non-volatile memory is electrically alterable read-only memory.

8. For use in a computer including a motherboard having a connector electrically connected to a reprogrammable logic circuit, the reprogrammable logic circuit further being electrically connected to a system bus having system bus signal lines, a CPU daughterboard comprising:

a daughterboard connector adapted to mate with the connector included on the motherboard;

a CPU having CPU signal lines electrically connected to the daughterboard connector; and a non-volatile memory containing a configuration program for the reprogrammable logic circuit, electrically connected to the reprogrammable logic circuit through the daughterboard connector when mated with the connected included on the motherboard; wherein loading in the reprogrammable logic circuit the configuration program contained in the non-statewide memory configures the reprogrammable logic circuit to map between the CPU signal lines and the system bus signal lines.

9. The CPU daughterboard of claim 8, wherein the non-volatile memory is read-only memory.

10. The CPU daughterboard of claim 8, wherein the non-volatile memory is electrically alterable read-only memory.

11. For use in a single-board computer including a daughterboard having on the daughterboard a CPU with CPU signal lines connected to a daughterboard connector and further having on the daughterboard a non-volatile memory containing a configuration program for a reprogrammable logic circuit of a predetermined type, a motherboard comprising:

a connector adapted to mate with the daughterboard connector; and a logic circuit of the predetermined type having input signal lines electrically connected to the motherboard connector and output signal lines connected to a system bus having system bus signal lines; wherein the non-volatile memory is further electrically connected to the reprogrammable logic circuit through the daughterboard connector when mated with the connector included on the motherboard; and loading in the reprogrammable logic circuit the configuration program contained in the non-statewide memory configures the reprogrammable logic circuit to map between the CPU signal lines and the system bus signal lines.

12. The CPU motherboard of claim 11, wherein the programmable logic circuit is a field-programmable gate array.

13. The CPU motherboard of claim 11, wherein the programmable logic circuit is an application-specific integrated circuit.

14. A CPU interconnect system for a computer, the computer including a CPU having input/output lines, the CPU physically located on a first module and the computer further including a system bus, the system bus physically located on a second module, the interconnect system comprising:

means for connecting the input/output lines of the CPU to the system bus in accordance with a mapping not fixed in the means for connecting, the mapping of the means for connecting reprogrammable and the means for connecting physically located on the second module;

means for loading the mapping into the means for connecting, the means for loading operative upon each occurrence of a predetermined event; and means for holding the mapping, the means for holding physically located on the first module.

15. The CPU interconnect system of claim 14, wherein the CPU physically located on the first module is one of a plurality of CPU types, and the mapping held by the means for holding corresponds to the CPU type.

16. The CPU interconnect system of claim 14 wherein the predetermined event is power up.

* * * * *